Jan. 11, 1938.     A. C. ROEBUCK     2,105,009
CONVERTIBLE MATERIAL WORKING MACHINE
Filed Nov. 16, 1936     2 Sheets—Sheet 2
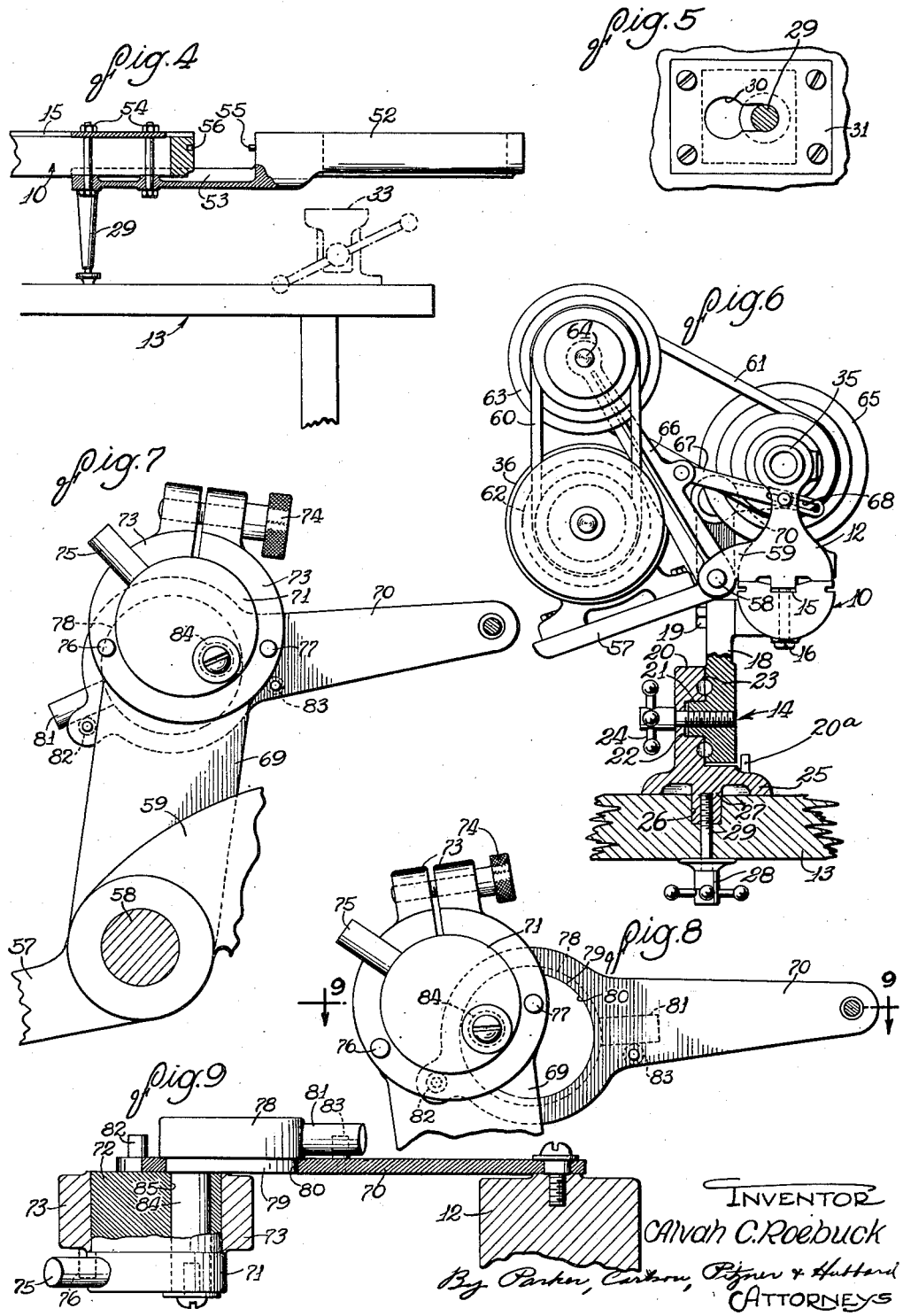
INVENTOR
Alvah C. Roebuck
By Parker, Carlson, Pitzner & Hubbard
ATTORNEYS Patented Jan. 11, 1938

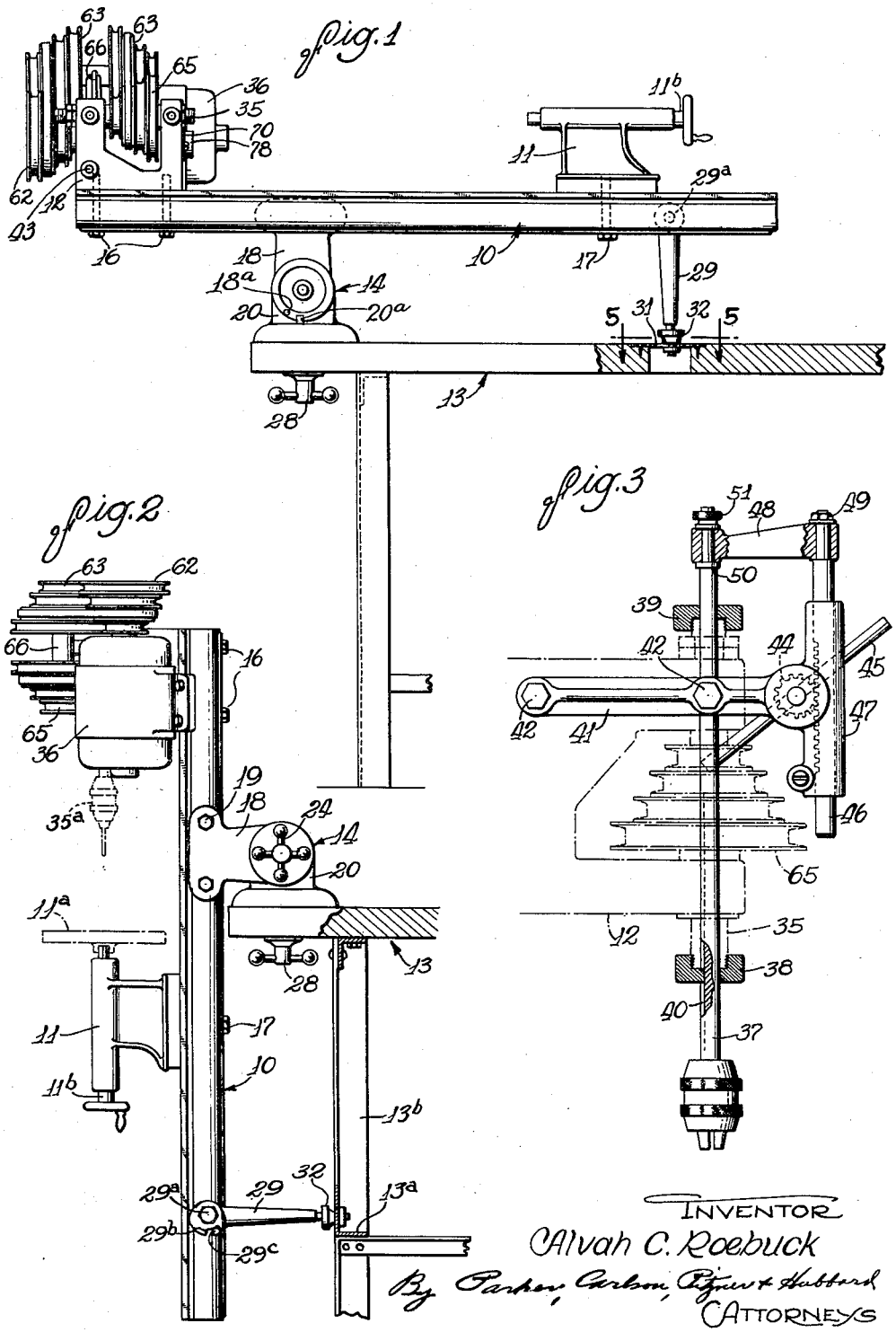

2,105,009

UNITED STATES PATENT OFFICE 2,105,009

CONVERTIBLE MATERIAL WORKING MACHINE

Alvah C. Roebuck, Evanston, Ill.

Application November 16, 1936, Serial No. 110,999

17 Claims. (Cl. 29—27)

The invention relates to material working machines and more particularly to machines adapted to perform a plurality of different operations such as turning, spinning, drilling, milling, grinding, routing, profiling, and the like.

The general object of the invention is to provide an improved and simplified machine especially adapted for use in small home and repair workshops and the like, which may be readily converted to perform a number of different operations on a variety of materials such as wood, metal, and the like.

A more specific object of the invention is to provide a convertible machine of the type described including an elongated lathe bed carrying a combined lathe and drill head, the bed being provided with an improved mounting of such character that the bed may be disposed horizontally over a work bench or other support for use as a horizontal lathe, or alternatively swung to a vertical position overhanging an edge of the bench for use as a vertical drill press or the like.

Another object of the invention is to provide an improved belt type driving connection between a driving motor and driven spindle or the like, of such character that the belt tension may be selectively varied by manipulation of one member and entirely relieved by manipulation of a second member.

The invention also resides in certain structural improvements in the bed, the combined lathe and drill head and various accessories of the machine.

Further objects and advantages of the invention will become apparent as the following description proceeds, and the features of novelty which characterize the invention are pointed out with particularity in the claims annexed to and forming a part of the specification.

For a better understanding of the invention, reference may be had to the accompanying drawings in which:

Figure 1 is a side elevation of a machine embodying the invention, the machine being mounted in a horizontal position on an ordinary work bench.

Fig. 2 illustrates the vertical position of the machine shown in Fig. 1 when in condition for use as a vertical drill press or the like.

Fig. 3 is an enlarged detail view partly in section of a drill feed attachment for the machine shown in Fig. 1.

Fig. 4 is a fragmentary detail view of a bed extension applied to the machine shown in Fig. 1.

Fig. 5 is an enlarged detail plan view of one of the leg clamping plates provided on the work bench, the cooperating leg being shown in section along the line 5—5 of Fig. 1.

Fig. 6 is an enlarged end elevation of the machine shown in Fig. 1.

Figs. 7 and 8 are enlarged detail views of the driving belt adjustment mechanism. Fig. 9 is a sectional view along the line 9—9 in Fig. 8.

For purposes of illustration, the invention has been shown as embodied in a machine particularly adapted for use in a home workshop, repair shop or the like. This machine includes in general an elongated lathe bed 10 carrying an adjustable tailstock 11 and a headstock or lathe head 12, which is also adapted to be used as a drill head or the like. The bed 10 is mounted adjacent the end of a work bench 13 by a universal joint indicated generally by the numeral 14. The machine may thus be used as a lathe when in the horizontal position shown in Fig. 1, or swung to the vertical position illustrated in Fig. 2 and utilized for drilling, milling, routing, profiling, and the like. As a whole, the machine is only a little more expensive to manufacture than an ordinary lathe of equal capacity, and yet its extreme flexibility of arrangement makes it possible to utilize it to perform a great variety of operations ordinarily had by a series of specialized machines beyond the means of the ordinary workman. In addition, the simplicity of the machine enables even a relatively unskilled user to manipulate the same without difficulty.

A strong rigid base is formed by the bed 10 since it is preferably fashioned as one continuous rigid piece without movable joints or sections so as to increase the accuracy of alinement of the elements thereon and consequently the accuracy of the machining operations performed thereby. The headstock 12 and tailstock 11 are mounted in suitable guideways 15 (Fig. 6) for selective sliding movement axially of the bed, and are releasably secured in position thereon by bolts 16 and 17, respectively, which are slidable in a groove or grooves in the lathe bed to permit of convenient adjustment of the headstock and tailstock as, for example, to locate the headstock adjacent a bed extension hereinafter described. A suitable tool rest for use in wood turning or a tool carriage for use in metal turning operations may be detachably mounted on the bed 10 in the usual manner. Such devices are well known and hence, have been omitted from the drawings in order to simplify the same.

The universal joint 14 supports the bed 10 for vertical and horizontal swinging movement about a point intermediate its ends. The joint 14 is preferably positioned adjacent one end of the work bench so that the portion of the bed carrying the headstock 12 overhangs the end of the bench while the opposite or inner end portion of the bed overlies the top work surface of the bench. In the particular construction illustrated the joint 14 includes a bracket 18, depending from the lower side of the bed 10 and cooperating with upstanding bracket or pedestal 20 (Fig. 6), the bracket 18 being secured in place by bolts 19. A cylindrical projection 21 formed on the face of the bracket 18 extends within a complementary cylindrical recess 22 in the adjacent face of the bracket 20, thus providing a bearing support for swinging movement of the bed 10 in a vertical plane. The adjacent faces of the brackets are machined flat, and are provided with annular opposed recesses 23 to facilitate more rigid contact, less machining, free turning and the retention of lubricant. The bed 10 may be clamped in either selected position in its vertical plane of movement by a locking screw provided with a handwheel 24 and threaded in a suitable tapped hole in the projection 21.

Rotative or swinging movement of the bed 10 in a horizontal plane is effected by the swiveling motion of the bracket 20 on the top of the work bench 13. A circular base 25 is formed on the bottom of the bracket 20, the adjacent faces of the bench and base 25 being provided with smooth cooperating clamping surfaces. An axial projection 27 on the base 25 projects into a recess 26 in the bench top, thus forming a trunnion for swiveling motion of the bed 10 in a horizontal plane. Releasable clamping of the bed 10 in a selected horizontal position is effected by a clamp screw 29 having a handwheel 28 thereon and extending through the top of the bench into threaded engagement with the projection 27.

When the machine is being used for performing ordinary lathe operations such as turning or spinning, the bed is secured in a horizontal position as shown in Fig. 1. For this purpose, a depending leg or bracket 29 is provided on the inner end portion of the bed. One end of the leg 29 is pivoted at 29ª in the bed 10 and is formed with a recess 29ᵇ receiving a pin 29ᶜ to limit the pivotal movement, for example, to such an extent that the leg cannot be swung counterclockwise (as viewed in Fig. 1) beyond the vertical position but can be swung somewhat in a clockwise direction to permit release as hereinafter described. The lower end of this leg fits in a bayonet or keyhole slot 30 formed in a metal plate 31 (Figs. 1 and 5) which is secured to the top of the work bench 13. A head on the lower end of the leg 29 underlies the edges of the narrow end of the slot 30 and a suitable lock nut 32 threaded on the lower end of the leg 29 releasably clamps the edges of the slotted plate against the head to hold the leg in position.

If it is desired to use the top of the work bench 13 for some work not involving the machine described, the handwheel 28 is rotated to unclamp the bed 10 and the end of the leg 29 removed from the plate 31 so that the bed 10 may be swung horizontally to extend transversely of the top of the work bench. Similarly, if it is desired to utilize the machine as a vertical drill press or the like, the handwheels 24 and 28 are rotated to unclamp the bed so that it may be swung through an arc of approximately 180 degrees in a horizontal plane and 90 degrees in a vertical plane to the position shown in Fig. 2. In this latter position the inner end of the bed 10 depends from the pivot while the headstock 12 is located above the tailstock 11. One of the cross pieces 13ª connecting the vertical legs of the bench is formed with a slot like the slot 30 in Fig. 5 with the small end downward and adapted to receive the free end of the leg 29 so that the latter may be clamped thereto by means of the lock nut 32 to provide an anchor. The cross piece thus provides a stop defining the vertical position of the bed 10 and prevents objectionable strain on the joint 14.

It will be noted that the elongation of the bracket 18 and leg 29 positions the bed 10 above the work surface of the bench in spaced relation thereto. As a consequence, other apparatus secured to the top of the work bench such as the machinist's vise 33 (Fig. 4) is in no way interfered with even when the bed 10 is disposed in horizontal position over the bench. It is thus possible to equip the work bench 13 in the usual manner and to utilize it as a work bench as well as a support for the convertible machine disclosed herein. A stop 18ª on the bracket 18 cooperates with a stop 20ª to limit swinging of the bed in a counterclockwise direction as viewed in Fig. 1, thus preventing the end of the bed from striking the bench due to any unbalanced weight of the headstock upon release of the leg 29. The stops permit sufficient upward movement of the bed, however, to allow disengagement of the leg 29.

The headstock 12 includes a hollow spindle 35 rotatably mounted in upstanding arms formed on the base of the headstock. This spindle is rotated by an electric driving motor 36 mounted at the outer end of the bed 10 adjacent the headstock. A suitable driving connection is provided between the spindle 35 and motor 36, this driving connection being preferably of the belted type and including an improved arrangement for adjusting the tension of the belt or belts as is hereinafter described in greater detail.

A chuck 35ª (Fig. 2) may be connected directly to the spindle 35 in fixed position to receive a suitable drill bit. Then when the machine is positioned as shown in Fig. 2, a work piece, supported on plate 11ª detachably secured to the tailstock, may be moved into engagement with the drill by rotating the screw feed tailstock handle 11ᵇ. Rotation of the spindle 35 by its associated driving motor, of course, rotates the chuck 35ª and drill carried thereby. This arrangement is particularly suited for use when a small amount of drilling is to be done so that only a minimum preliminary adjustment of the machine is required.

In the event that a large amount of drilling is to be done, an attachment shown in Fig. 3 may be conveniently utilized to effect axial feeding movement of a drill shaft 37 in the same general manner as in a conventional drill press. The drill shaft 37 is inserted in the hollow spindle 35. Collars 38 and 39 threaded on the opposite ends of the spindle 35 serve to maintain the drill shaft in position. A tongue on the collar 38 cooperates with a longitudinal groove 40 in the drill shaft 37 to prevent relative rotation between the spindle 35 and the drill shaft while permitting relative longitudinal movement therebetween. Rotation of the spindle 35 by the driving motor 36 thus serves to rotate the drill shaft 37 and axial feeding movement of the latter may be effected. The attachment for effecting axial feeding of the drill shaft 37 includes a bracket 41 detachably secured to the side of the headstock 12 by a pair of cap screws 42 threaded in tapped holes 43 (Fig. 1). A pinion 44 provided with a manual operating lever 45 is journaled on the outer end of the bracket 41 and meshes with a rack 46 which is in turn slidably mounted in a hollow sleeve 47 formed on the outer end of the bracket. A rigid connection between the drill shaft 37 and rack 46 is formed by an arm 48 which is secured to the end of the rack 46 by a clamping nut 49. The opposite end of the arm 48 loosely surrounds the drill shaft 37 and it held against axial movement with respect thereto between a washer 50 and a lock nut 51. It will thus be seen that rotation of the pinion 44 serves to effect an axial feeding movement of the drill shaft 37. In addition, the rack 46 and arm 48 may be readily detached at any time by removal of the lock nut 51 and the washer 50 or the entire mechanism may be detached by removing the screws 42 and lock nut 51.

An extension may be provided on the bed 10 to accommodate unusually long work blanks or for turning or spinning pieces of large diameter where a greater swing is required. Fig. 4 illustrates a preferred form of extension 52 for this purpose. The main body portion of the extension 52 is provided with a guideway on the top thereof which is disposed in alignment with the guideway on the bed 10 and is adapted to support the tailstock 11. The connection between the bed 10 and extension 52 preferably includes a channel-shaped projection 53 formed on the extension and adapted to be slidably positioned on the lower side of the bed with the sides of the projection 53 extending about the sides of the bed. The extension is clamped in its adjusted position by bolts 54. When a connection of special precision and rigidity is required, a dowel pin 55 on the end of the extension is positioned in a complementary recess 56 in the end of the bed. When the adjacent end faces of the bed and extension are disposed in spaced relation as shown in Fig. 4, with the open side of the channel-shaped projection facing upwardly, space is provided therebetween to accommodate a work piece of unusually large diameter. The extension 52 is designed primarily for use in wood turning and spinning operations or the like in which a high degree of precision and consequently, an extremely accurate alinement of the headstock and tailstock, are not required.

An improved and simplified arrangement has been provided for connecting the electric motor 36 and spindle 35 in operative relation. This connection is of the belted type and is of such character that the tension in the belt or belts may be adjusted at will and also may be entirely released in order to avoid stretching the belts when not in use and to facilitate removal, replacement or adjustment thereof. The motor 36 is mounted for swinging movement relatively to the spindle 35 about an axis eccentric with respect to the axis of rotation of the motor. Thus, in the particular construction illustrated, the motor is carried by a bracket 57 (Fig. 6) pivoted by a pin or shaft 58 on lateral projections 59 extending from the base of the headstock 12. A belt 60 serves to connect a set of stepped speed change pulleys 62 on the motor shaft with a complementary intermediate set of pulleys 63 on a counter-shaft 64 and a second belt 61 serves to connect this intermediate set of pulleys 63 with a set of speed change pulleys 65 carried by the spindle 35. The counter-shaft is carried by an arm 66 pivotally mounted on the pin 58 and limited in its swinging movement by link 67 pivotally connected thereto and having a pin and slot connection 68 with the headstock 12. It will thus be seen that when the motor 36 is swung downwardly in a counterclockwise direction (as viewed in Fig. 6) both of the belts 60 and 61 will be tightened while, conversely, the tension in both of the belts will be decreased as the motor is swung in a clockwise direction about its pivot.

A novel arrangement has been provided for selectively varying the tension in both of the belts 60 and 61 simultaneously and for completely releasing the tension in the belts at will. This arrangement includes in general a double eccentric connection between the motor support and spindle support by means of which a selected relative movement therebetween is effected. In the preferred construction illustrated, an arm 69 (Fig. 7) extends upwardly from the bracket 57, being rigidly secured thereto. A link 70 pivotally mounted on the headstock 12 extends into juxtaposition with the arm 69 and the double eccentric connection is had between this arm and link. A member 71 having a cylindrical projection 72 is rotatably journaled in a split bearing sleeve 73 integral with the upper end of the arm 69, the split sleeve being held in engagement therewith by an adjusting screw 74. Rotation of the member 71 is effected by a projecting operating handle 75 adapted to be oscillated between stops 76 and 77 on the arm 69 upon loosening the screw 74. A similar rotatable member 78 (Fig. 9) is carried by the cylinder 72, the member 78 being provided with a cylindrical extension 79 journaled in a round hole 80 formed in the link 70. A manual operating lever 81 extending from the member 78 may be moved between a pair of stops 82 and 83 on the link 70 to rotate the member 78. The members 71 and 78 are connected by a pin 84 which is eccentrically mounted on the member 78 and extends through an eccentrically disposed recess or hole 85 in the member 71.

Movement of the member 71 serves to adjust the tension in the belts 60 and 61, while movement of the member 78 serves to place the belts under tension or entirely relieve the same from tension. Thus, movement of the operating lever 81 on member 78 from contact with its stop 83 to contact with its stop 82 swings the motor bracket 57 in a clockwise direction, as viewed in Fig. 6, thereby relieving the tension in the belts 60 and 61. When the member 78 is rotated in the opposite direction the tension will again be applied to the belts. Similarly, movement of the lever 75 through the arc defined by the stops 76 and 77 serves to vary the tension in the belts by swinging the motor bracket 57. Movement of the lever 75 in a counterclockwise direction as viewed in Fig. 7, from the stop 77 toward the stop 76, swings the motor supporting bracket 57 in the same direction, that is, counterclockwise, thereby increasing the tension in the belts. A graduated scale may be placed on the sleeve 73 adjacent the lever 75 to cooperate therewith in indicating the degree of adjustment. It will thus be seen that a very simple and effective arrangement has been provided for controlling the tensioning of the driving belts. It is particularly desirable to have a separate adjustment member such as the member 78 for completely relieving the tension in the belts in order that the operator can quickly effect this operation either when the machine is to remain idle for a time or when he desires to shift the belts to different sets of pulleys. It will also be seen that the setting of the variable adjustment member 71 is not changed when the belt tension is relieved by member 78, and consequently, when the belt is again placed under tension by the member 78 the amount of the tension will be of the value previously determined by the adjustment of the member 71. The arc of movement for the handle 81 is long enough between stops 82 and 83 that the eccentric passes over dead-center and as a result the weight of the motor will hold the belts loose or tensioned in the respective extreme positions of the handle.

Although a particular embodiment of the invention has been shown and described for purposes of illustration, it will be understood that there is no intention to thereby limit the invention to this particular embodiment but on the other hand, the appended claims are intended to cover all modifications within the spirit and scope of the invention.

I claim as my invention:

1. In combination a work bench or the like having a horizontal work surface, an elongated continuous rigid lathe bed disposed above said surface in spaced relation thereto, thereby leaving said surface unobstructed, the outer end of said bed overhanging the adjacent end of said bench and the inner end overlying the bench, a swivel joint supporting said bed at said end of said bench and intermediate the ends of said bed for both horizontal and vertical swinging movement, whereby the inner end of the bed overlying the bench may be swung to a depending vertical position at the end of the bench, a combined lathe and drill head carried by said overhanging portion of the bed, and means for releasably securing said inner end of the bed rigidly in position on either the top or end of said bench.

2. In combination a work bench or the like, an elongated lathe bed disposed above said bench, the outer end of said bed overhanging the adjacent end of said bench and the inner end overlying the bench, a depending bracket secured to said bed intermediate its ends, an upstanding cooperating bracket pivotally mounted on said bench adjacent one end thereof for movement about a vertical axis, means pivotally connecting said brackets for movement about a horizontal axis, whereby the inner end of the bed overlying the bench may be swung to a depending vertical position at the end of the bench, a combined lathe and drill head carried by said overhanging portion of the bed, and means for releasably securing said inner end of the bed rigidly in position on either the top or end of said bench.

3. In combination a work bench or the like, an elongated lathe bed disposed above said bench, the outer end of said bed overhanging the adjacent end of said bench and the inner end overlying the bench, a swivel joint supporting said bed at said end of said bench and intermediate the ends of said bed for both horizontal and vertical swinging movement, whereby the inner end of the bed overlying the bench may be swung to a depending vertical position at the end of the bench, selectively operable means for releasably clamping said bed against horizontal swinging movement and against vertical swinging movement, and a combined lathe and drill head carried by said overhanging portion of the bed.

4. A convertible lathe and drill comprising an elongated continuous rigid lathe bed, a combined lathe and drill head mounted on said bed adjacent one end thereof, a driving motor for said head mounted on said bed adjacent thereto, and means for supporting said bed at a point intermediate its ends for both horizontal and vertical swinging movement about the end of a work bench or the like, whereby said bed may be swung from a horizontal position with the outer end thereof carrying said head overhanging the end of the bench and the inner end thereof overlying the bench to a vertical position at the end of the bench with said inner end depending therefrom and said head positioned at the upper end of the bed.

5. A convertible lathe and drill comprising an elongated lathe bed, a combined lathe and drill head mounted on said bed adjacent one end thereof, a driving motor for said head mounted on said bed adjacent thereto, means supporting said bed at a point intermediate its ends for both horizontal and vertical swiveling movement about the end of a work bench or the like, whereby said bed may be swung from a horizontal position with the outer end thereof carrying said head overhanging the end of the bench and the inner end thereof overlying the bench to a vertical position at the end of the bench with said inner end depending therefrom and said head positioned at the top of the bed, and means including a bracket extending from the inner portion of said bed for releasably securing the same rigidly in either its horizontal or vertical positions.

6. In combination, an elongated lathe bed, a headstock carried by said bed having a rotatable spindle mounted thereon, an electric driving motor for said spindle, means for pivotally mounting said motor in operative relation to said headstock for movement with respect thereto about an axis eccentric with respect to the axis of rotation of said motor, means including a belt for connecting said motor and spindle in operative relation, adjustment means for selectively varying the tension in said belt, and means independent of said adjustment means operable at will to entirely release the tension in said belt without altering the setting of said adjustment means, whereby when the tension is again imposed on said belt by said last-named means it will be of a value determined by the previous setting of said adjustment means.

7. In combination, an elongated lathe bed, a headstock having a rotatable spindle mounted thereon carried by said bed, an electric driving motor for said spindle, means for pivotally mounting said motor on said headstock for movement with respect thereto about an axis eccentric with respect to the axis of rotation of said motor, complementary sets of speed change pulleys of different diameters carried by said spindle and said motor, means including a belt cooperating with said pulleys for connecting said motor and spindle in operative relation, adjustment means for selectively varying the tension in said belt, and means independent of said adjustment means operable at will to entirely release the tension in said belt without altering the setting of said adjustment means, whereby when the tension is again imposed on said belt by said last-named means it will be of a value determined by the previous setting of said adjustment means.

8. In combination, a rotatable driven spindle or the like, an electric driving motor therefor, means supporting said motor for pivotal movement toward and away from said spindle, means including a belt for connecting said motor and spindle in operative relation, adjustment means for selectively varying the tension in said belt, and means independent of said adjustment means operable at will to entirely release the tension in said belt without altering the setting of said adjustment means, whereby when the tension is again imposed on said belt by said last-named means it will be of a value determined by the previous setting of said adjustment means.

9. In combination, a rotatable driven spindle or the like and a support therefor, an electric driving motor, means supporting said motor for pivotal movement toward and away from said spindle, means including a belt for connecting said motor and spindle in operative relation, cooperating rotatable members carried by said spindle and motor support, and means including an eccentrically located projection on one of said members disposed in a registering recess arranged eccentrically of the other of said members for moving said motor support to adjust the tension in said belt upon rotation of one of said members and for entirely releasing the tension in said belt upon rotation of the other of said members.

10. In combination, a rotatable driven spindle or the like and a support therefor, an electric driving motor, means supporting said motor for pivotal movement toward and away from said spindle, means including a belt for connecting said motor and spindle in operative relation, cooperating rotatable members carried by said spindle and motor supports respectively, means for operatively connecting said members at respectively eccentric points to effect an oscillatory movement of said motor support with respect to said spindle support in response to the rotation of either of said members.

11. In combination, a rotatable driven spindle or the like and a support therefor, an electric driving motor, a pivoted bracket supporting said motor for movement toward and away from said spindle, means including a belt for connecting said motor and spindle in operative relation, an arm projecting from said bracket, a manually rotatable member journaled on said bracket having an axially extending eccentrically disposed aperture therein, a link extending from said spindle support adjacent said member, a second manually rotatable member journaled on said link, a projection on said second member extending into said aperture, means limiting the rotation of said first member to a predetermined arc, and means limiting the rotation of said second member to a predetermined arc whereby rotation of said first member effects adjustment of the belt tension and rotation of said second member from one extremity of its path of movement to the other selectively relieves or imposes tension on said belt.

12. In combination, an elongated lathe bed, a combined lathe and drill head mounted on said bed adjacent one end thereof, means for pivotally mounting said bed at a point intermediate its ends on a work bench or other support, said head being mounted on the outer portion of said bed overhanging an end of the bench and the inner portion of the bed overlying the bench, said bed being movable about said pivotal mounting to a vertical position with said inner end portion thereof depending from the bench, said inner end portion being of shorter length from the pivot than the height of the pivot from the bottom of the bench, and a detachable extension adapted to be secured to said inner end portion when said bed is in a horizontal position on the bench to accommodate long work pieces thereon.

13. In combination, a lathe bed having a guideway on the top thereof, a detachable extension adapted to be secured to one end of said bed, said extension having a guideway thereon disposed in alinement with the guideway in the bed, a channel-shaped projection on said extension adapted to extend about the lower side of the adjacent end portion of said bed, means for detachably clamping said extension in position on said bed, and a dowel pin for maintaining said bed and extension in axial alinement.

14. In combination, a lathe bed having a guideway on the top thereof, a detachable extension adapted to be secured to one end of said bed, said extension having a guideway thereon disposed in alinement with the guideway on the bed, and means including a channel-shaped projection on said extension adapted to embrace the adjacent end of said bed for maintaining said extension in position on said bed, said projection being located a substantial distance below the upper surface of said bed and extension and having its open side facing upwardly to accommodate a large diameter work piece.

15. In combination, a work bench or the like, an elongated lathe bed disposed above said bench, at least a portion of said bed overlying the bench, a depending bracket secured to said bed intermediate its ends, an upstanding cooperating bracket pivotally mounted on said bench adjacent one end thereof for movement about a vertical axis, means pivotally connecting said brackets for movement about a horizontal axis, whereby the inner end of the bed overlying the bench may be swung horizontally to clear the bench and then vertically to a depending vertical position over an edge of the bench, a combined lathe and drill head carried by said bed adjacent one end thereof, means for releasably securing the inner end of the bed rigidly in position on either the top or side of said bench, and means for limiting the upward swinging movement of said bed about said horizontal axis to prevent undesired movement thereof due to any unbalanced weight of said combined lathe and drill head on the overhanging end portion thereof.

16. In a convertible lathe and drill, an elongated lathe bed adapted to carry a combined lathe and drill head and a tailstock, a pedestal adapted for mounting on a work bench or the like adjacent an edge thereof, and means including a universal joint supporting said bed intermediate its ends on said pedestal for swinging movement about either a vertical or horizontal axis, whereby said bed may be positioned horizontally over the bench at any angle selected about said vertical axis for use as a lathe or swung about its vertical axis to clear the bench and then about its horizontal axis to a vertical position depending over an edge of the bench for use as a vertical drill press.

17. In a convertible lathe and drill, an elongated lathe bed, means including a universal joint supporting said bed intermediate its ends on a work bench or the like for swinging movement about either a vertical or horizontal axis whereby the bed may be swung horizontally to clear the top of the bench and then about its horizontal axis to a vertical position for drilling, and means for releasably clamping said bed against movement about either said horizontal or vertical axes.

ALVAH C. ROEBUCK.